United States Patent
Chang (10) Patent No.: US 11,836,061 B2
(45) Date of Patent: Dec. 5, 2023

(54) ASSURING FAILSAFE RADIO TRANSMIT POWER LEVEL CONTROL IN HARDWARE

(71) Applicant: Dell Products L.P., Round Rock, TX (US)

(72) Inventor: Ching Wei Chang, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 141 days.

(21) Appl. No.: 17/376,428

(22) Filed: Jul. 15, 2021

(65) Prior Publication Data

US 2023/0013298 A1    Jan. 19, 2023

(51) Int. Cl.
| | |
|---|---|
| G06F 11/30 | (2006.01) |
| G06F 1/3206 | (2019.01) |
| G06F 1/3287 | (2019.01) |
| G06F 11/07 | (2006.01) |
| H04W 52/02 | (2009.01) |
| G06F 1/28 | (2006.01) |

(52) U.S. Cl.
CPC ........ *G06F 11/3058* (2013.01); *G06F 1/3206* (2013.01); *G06F 1/3287* (2013.01); *G06F 11/0724* (2013.01); *G06F 11/0751* (2013.01)

(58) Field of Classification Search
CPC .. G06F 11/3058; G06F 1/3206; G06F 1/3287; G06F 11/0724; G06F 11/0751
See application file for complete search history.

(56) References Cited

U.S. PATENT DOCUMENTS

| | | | | |
|---|---|---|---|---|
| 9,807,705 | B2 * | 10/2017 | Zhang | H04W 4/023 |
| 2006/0265158 | A1 * | 11/2006 | Bandholz | G06F 11/008 |
| | | | | 702/65 |
| 2008/0218148 | A1 | 9/2008 | Robertson et al. | |
| 2010/0235659 | A1 | 9/2010 | Sawyers et al. | |
| 2011/0305926 | A1 * | 12/2011 | Kim | H02J 7/0031 |
| | | | | 429/50 |
| 2012/0244895 | A1 * | 9/2012 | Thomas | H04B 7/0817 |
| | | | | 455/500 |
| 2014/0239713 | A1 | 8/2014 | Kanzaki et al. | |
| 2014/0327308 | A1 | 11/2014 | Cargile et al. | |
| 2017/0373514 | A1 * | 12/2017 | Troberg | H02J 7/0014 |
| 2018/0076809 | A1 | 3/2018 | Ohmi et al. | |
| 2020/0192451 | A1 * | 6/2020 | Messick | G06F 1/3206 |
| 2020/0195289 | A1 * | 6/2020 | Chang | H04W 52/18 |
| 2022/0240103 | A1 * | 7/2022 | Gummadi | H04W 76/27 |

* cited by examiner

*Primary Examiner* — Jaweed A Abbaszadeh
*Assistant Examiner* — Gayathri Sampath
(74) *Attorney, Agent, or Firm* — Larson Newman, LLP (57) ABSTRACT

An information handling system includes a failsafe circuit connected to a first power control interconnect conductor, to a second power control interconnect conductor, and to a processor status interconnect conductor. A processor may provide a first level indicating an operational status of the processor to the processor status interconnect conductor when the processor is operational, and provide a second level indicating a non-operational status of the processor to the processor status interconnect conductor when the processor is non-operational. The failsafe circuit may assure, upon provision of the second level to the processor status interconnect conductor, that the first power control interconnect conductor will be in a first failsafe state and the second power control interconnect conductor will be in a second failsafe state.

20 Claims, 4 Drawing Sheets

ASSURING FAILSAFE RADIO TRANSMIT POWER LEVEL CONTROL IN HARDWARE

FIELD OF THE DISCLOSURE

The present disclosure generally relates to information handling systems, and more particularly to a system and method for assuring failsafe radio transmit power level control in hardware.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a failsafe circuit connected to a first power control interconnect conductor, to a second power control interconnect conductor, and to a processor status interconnect conductor. A processor may provide a first level indicating an operational status of the processor to the processor status interconnect conductor when the processor is operational, and provide a second level indicating a non-operational status of the processor to the processor status interconnect conductor when the processor is non-operational. The failsafe circuit may assure, upon provision of the second level to the processor status interconnect conductor, that the first power control interconnect conductor will be in a first failsafe state and the second power control interconnect conductor will be in a second failsafe state.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
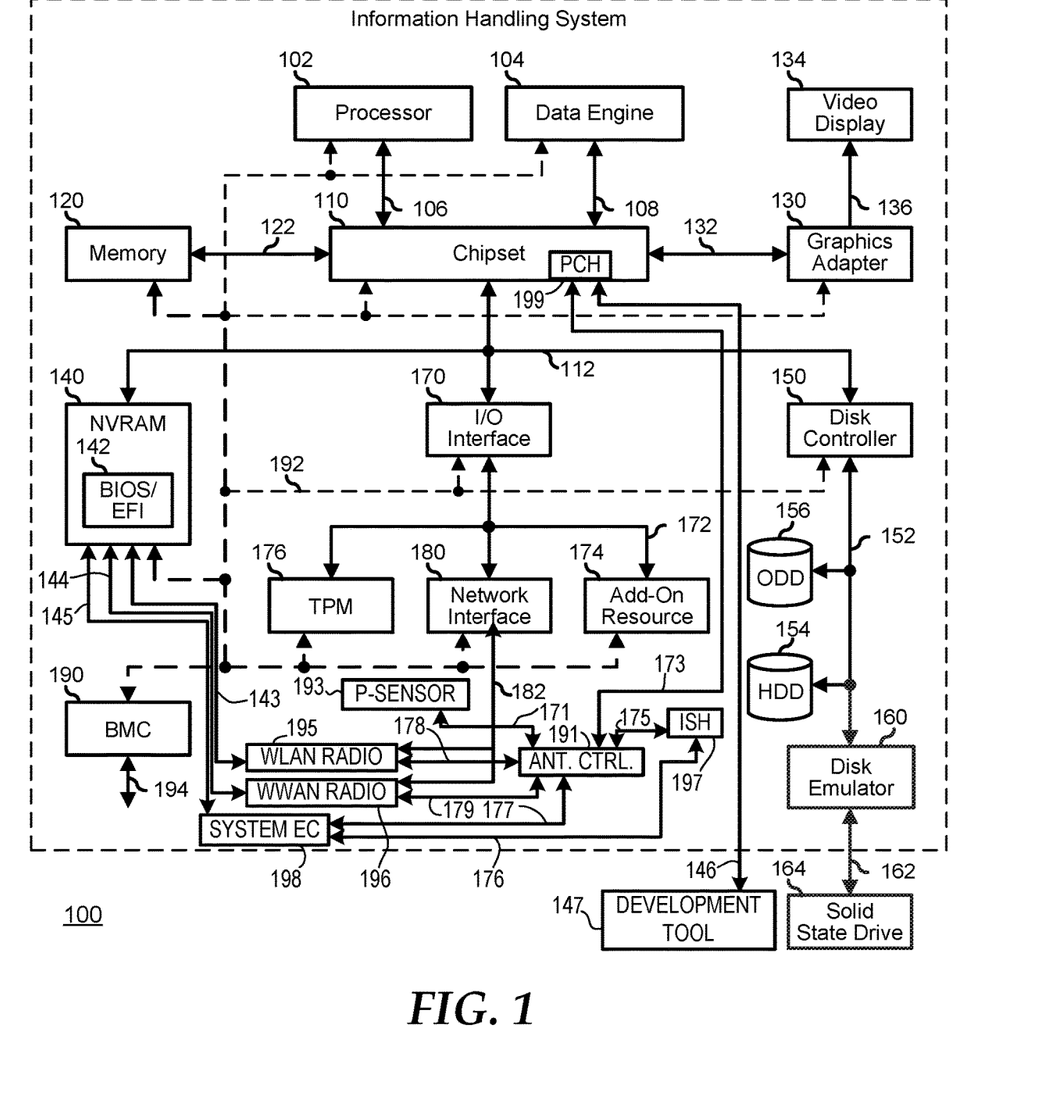
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, a network interface 180, baseboard management controller (BMC) 190, antenna controller (AC) 191, proximity sensor (P-sensor) 193, wireless local area network (WLAN) radio 195, wireless wide area network (WWAN) radio 196, integrated sensor hub (ISH)

197, and system embedded controller (EC) 198. Chipset 110 comprises platform controller hub (PCH) 199. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channel 182 that can provide an interface to devices that are internal or external to information handling system 100. In a particular embodiment, network channel 182 is of a different type than peripheral channel 172 and network interface 180 translates information from a format suitable to the peripheral channel to a format suitable to external devices. An example of network channel 182 includes InfiniBand channels, Fibre Channel channels, Gigabit Ethernet channels, proprietary channel architectures, or a combination thereof. Network channel 182 can be connected to external network resources (not illustrated), either directly or via a component such as WLAN radio 195, WWAN radio 196, or both. The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external IHS.

Network interface 180 is connected to WLAN radio 195 and WWAN radio 196 via network channel 182. WLAN radio 195 is connected to antenna controller (AC) 191 via interconnect 178. WWAN radio 196 is connected to AC 191 via interconnect 179. AC 191 is connected to proximity sensor (P-sensor) 193 via interconnect 171. AC 191 is connected to integrated system hub (ISH) 197 via interconnect 175. ISH 197 is connected to system embedded controller (EC) 198 via interconnect 176. AC 191 is connected to system EC 198 via interconnect 177. System EC 198 is connected to NVRAM 140 comprising BIOS/EFI 142 via interconnect 145. NVRAM 140 is connected to WLAN radio 195 via interconnect 143. NVRAM 140 is connected to WWAN radio 195 via interconnect 144. AC 191 is connected to platform controller hub (PCH) 199 via interconnect 173. PCH 199 can be connected to a development tool 147 via interconnect 146. Elements within IHS 100 can be implemented as described using similar names with respect to elements shown on other drawings described below.

Figure 2:
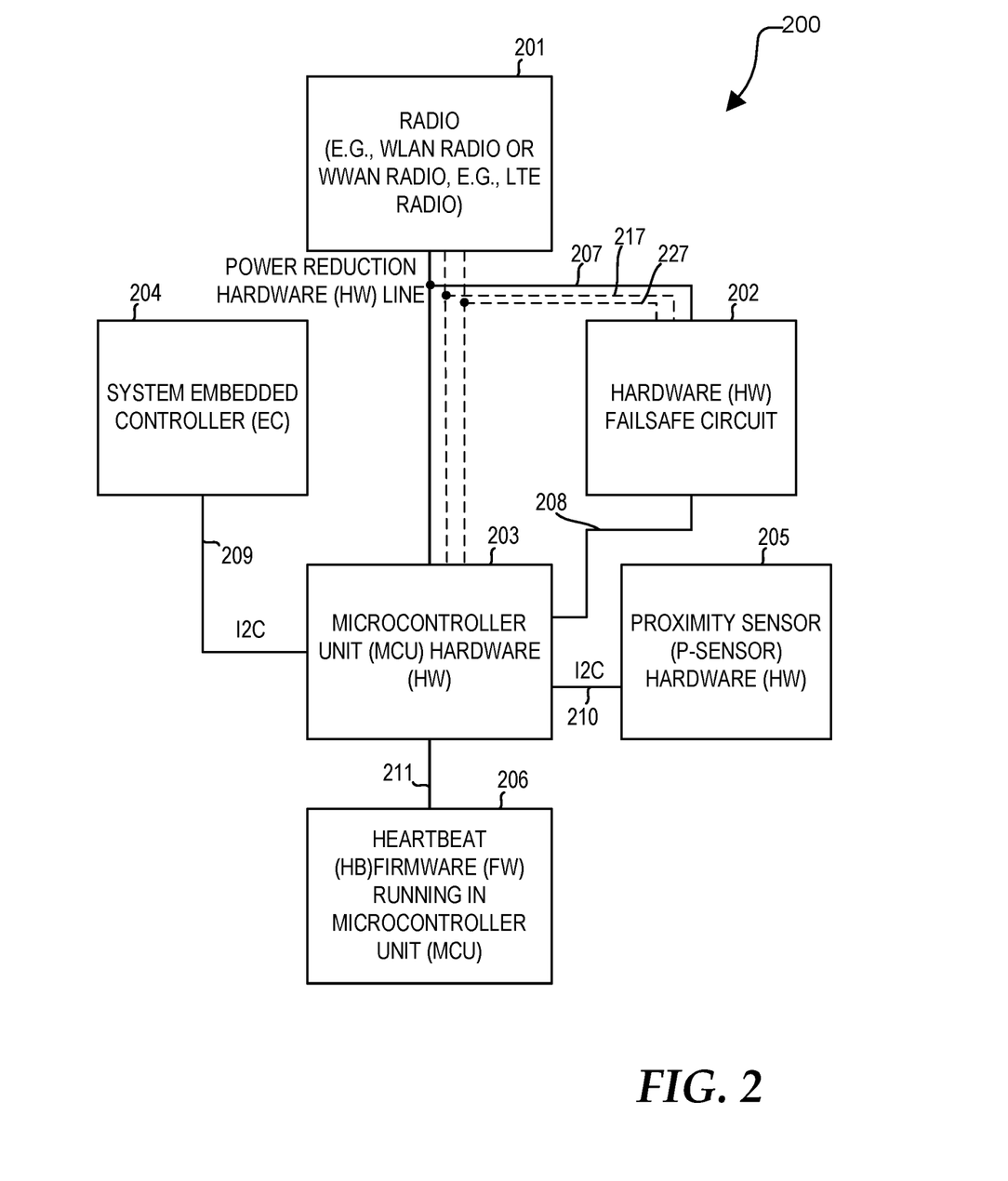
FIG. 2 is a block diagram illustrating a system for providing failsafe radio transmit power control according to at least one embodiment of the present disclosure.

FIG. 2 shows a system for providing failsafe radio transmit power control according to at least one embodiment of the present disclosure. System 200 includes a radio 201, such as a wireless local-area network (WLAN) radio or a wireless wide-area network (WWAN) radio, for example a long-term-evolution (LTE) radio, a hardware (HW) failsafe circuit 202, microcontroller unit (MCU) hardware (HW) 203, a system embedded controller (EC) 204, proximity sensor (P-sensor) hardware 205, and heartbeat (HB) firmware (FW) 206 running in MCU HW 203. Radio 201 is connected to HW failsafe circuit 202 and to MCU HW 203 via power reduction hardware (HW) line 207, which is an electrical interconnect. HW failsafe circuit 202 is connected to MCU HW 203 via interconnect 208. System EC 204 is connected to MCU HW via interconnect 209 which may, for example, be a serial interface such as an inter-integrated-circuit (I2C) bus. P-sensor 205 is connected to MCU HW via interconnect 210 which may, for example, be a serial interface such as an I2C bus. Storage for HB FW 206 is connected to MCU HW via interconnect 211 which may, as examples, be an internal interconnect to storage within MCU HW 203 or an external interconnect to separate storage such as a memory integrated circuit (IC).

System 200 can further include power reduction hardware (HW) lines 217 and 227, along with power reduction hardware (HW) line 207, each of which may be connected to radio 201, MCU HW 203, and HW failsafe circuit 202. Together they may form a parallel communication bus over which MCU HW may pass digital data to radio 201 to select a radio transmit power level of radio 201. As an example, the selected radio transmit power level may be reduced from a full radio transmit power level of radio 201 through the use of such power reduction HW lines. Under normal operation, such lines can be driven by MCU HW 203 and, if used bidirectionally, by radio 201 at other times, without influence of HW failsafe circuit 202.

However, when a malfunction is detected, HW failsafe circuit 202 can force the lines to signal levels representative of a failsafe radio transmit power level value instructing radio 201 to transmit at a failsafe radio transmit power level. If the malfunction ends and normal operation is ready to resume, HW failsafe circuit 202 can switch back to a high-impedance mode, allowing the levels on the lines to be controlled by MCU HW 203 (or radio 201) without influence of HW failsafe circuit 202. Thus, a processor can be configured to individually control each of a plurality of power reduction HW lines to select a transmit power level to be used by a radio circuit to which the power reduction HW lines are connected.

A processor, such as MCU HW 203 can be configured to alert HW failsafe circuit 202 to malfunction of MCU HW 203 or other devices connected to it, such as P-sensor HW 205. A MCU watchdog circuit can detect malfunction of MCU HW 203 and provide a signal via interconnect 208, which can serve as a processor status interconnect conductor, to trigger HW failsafe circuit 202. The MCU HW 203 or a separate watchdog circuit can be configured to detect a malfunction of a device to which it is connected or along a communication path connecting it to such a device so that a processor, such as MCU HW 203, can indicate a malfunction of such a device, as well as indicating a malfunction of the processor itself. Therefore, in the event of either such malfunction, the processor can provide a signal via interconnect 208 to trigger failsafe operation of HW failsafe circuit 202.

Figure 3:
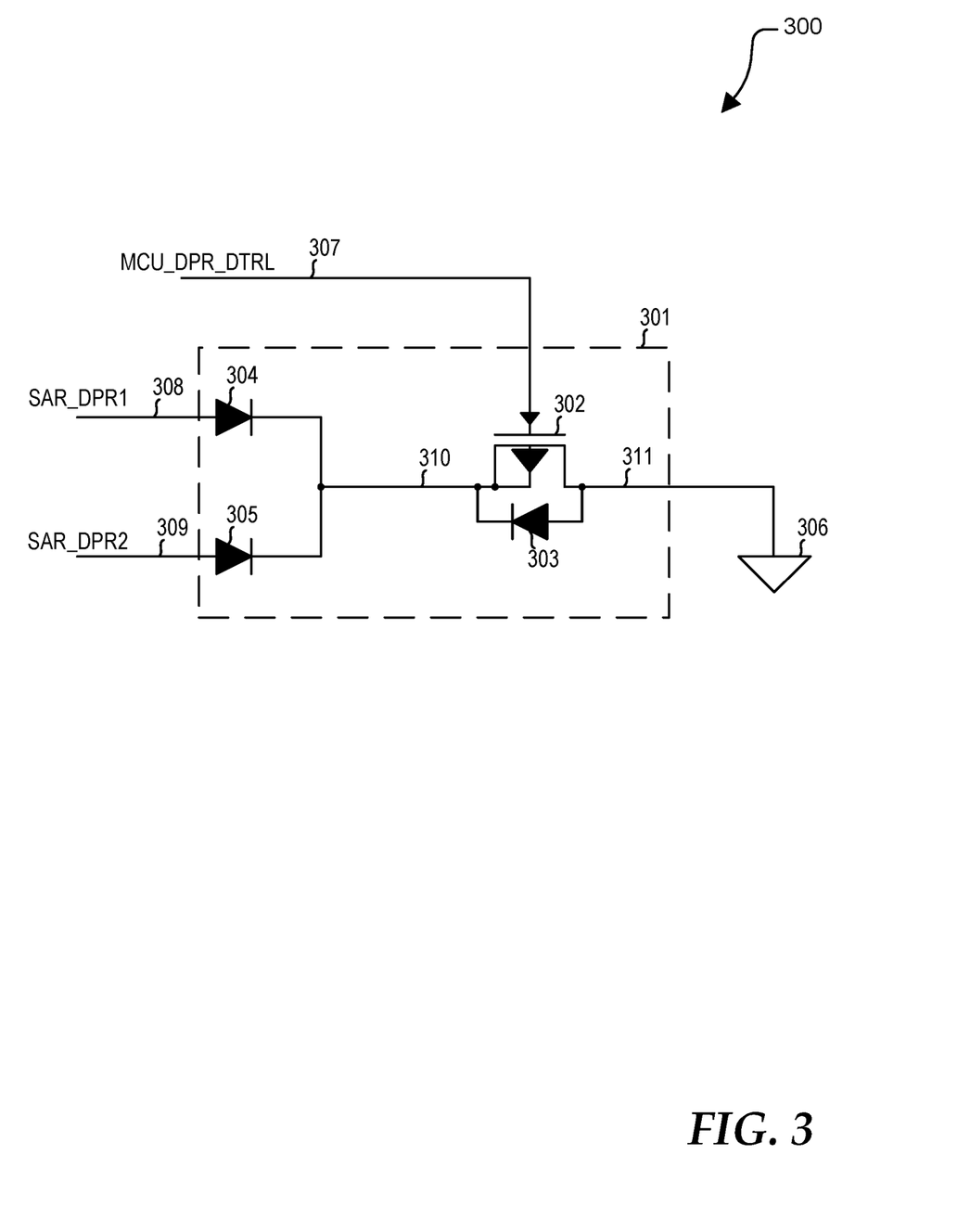
FIG. 3 is a schematic diagram illustrating a failsafe circuit according to at least one embodiment of the present disclosure.

FIG. 3 shows a failsafe circuit according to at least one embodiment of the present disclosure. Failsafe circuit 301 may be used as or as part of hardware failsafe circuit 202 of FIG. 2. Failsafe circuit 301 includes a transistor 302, diode 304, and diode 305. As an example, transistor 302 may be a metal-oxide-semiconductor field-effect transistor (MOSFET). As a more specific example, transistor 302 may be a positive-channel (P-channel) MOSFET. As an even more specific example, transistor 302 may be an enhancement-mode P-channel MOSFET. Transistor 302 may be provided, internally or externally, with a reverse-biased diode 303, which can, for example, provide protection for transistor 302. The cathode of reverse-biased diode 303 is connected to the source terminal of transistor 302, and the anode of reverse-biased diode 303 is connected to the drain terminal of transistor 302.

A first power control interconnect conductor 308, labeled SAR_DPR1, is connected to a first terminal of failsafe circuit 301. A second power control interconnect conductor 309, labeled SAR_DPR2, is connected to a second terminal of failsafe circuit 301. As an example, first power control interconnect conductor 308 may be used to implement power reduction HW line 207 of FIG. 2, and second power control interconnect conductor 309 may be used to implement power reduction HW line 217 of FIG. 2. Additional instances of power control interconnect conductors and corresponding diodes may be used to implement additional power reduction HW lines, such as power reduction HW line 227 of FIG. 2. A processor status interconnect conductor 307, labeled MCU_DPR_DTRL, is connected to a third terminal of failsafe circuit 301. The processor status interconnect conductor 307 is connected to a gate terminal of transistor 302 via the third terminal of failsafe circuit 301.

The first power control interconnect conductor 308 is coupled to a source terminal of transistor 302 via diode 304. Specifically, the first power control interconnect conductor 308 is connected to an anode terminal of diode 304, and a cathode terminal of diode 304 is connected via interconnect 310 to the source terminal of transistor 302. The second power control interconnect conductor 309 is coupled to a source terminal of transistor 302 via diode 305. Specifically, the second power control interconnect conductor 309 is connected to an anode terminal of diode 305, and a cathode terminal of diode 305 is connected via interconnect 310 to the source terminal of transistor 302. A drain terminal of transistor 302 is connected via interconnect 311 to ground potential 306.

First power control interconnect conductor 308 and second power control interconnect conductor 309 can be used to communicate power control information by applying a first logic signal to the first power control interconnect conductor 308 and a second logic signal to the second power control interconnect conductor 309. As an example, a MCU of an antenna controller can apply the first logic signal at an appropriate first power control logic level and the second logic signal at an appropriate second power control logic level, which can, for example, serve together as a multi-bit power control value to select from a plurality of transmit power levels of which a radio is capable upon receipt of the value by the radio. However, upon possible failure of the antenna controller, such as failure of its MCU or the firmware being executed by its MCU, loss of control of the first and second logic signals may occur, with the possible result that the radio may have an incorrect transmit power level. Processor status interconnect conductor 307 may be used, through the operation of failsafe circuit 301, to drive first power control interconnect conductor 308 and second power control interconnect conductor 309 to instruct the radio to adopt a failsafe transmit power level in the event of processor failure, such as failure of the antenna controller, which may include failure of a MCU within in the antenna controller.

When a processor controlling a radio's transmit power level is operational (e.g., operating normally), processor status interconnect conductor 307 is maintained at a high logic level, positive relative to ground potential 306, to turn off transistor 302. When transistor 302 is turned off, diodes 304 and 305 effectively isolate first power control interconnect conductor 308 and second power control interconnect conductor 309 from each other, and turned-off transistor 302 prevents failsafe circuit 301 from influencing the first logic signal and the second logic signal of first power control interconnect conductor 308 and second power control interconnect conductor 309, respectively.

Processor status interconnect conductor 307 can be driven from a source that exhibits a state dependent upon the operational status of the processor normally controlling the radio's transmit power level. For example, a processor watchdog circuit can provide a high logic level output when the processor is operational and a low logic level output when the processor is not operational. Such a processor watchdog circuit can be included within a processor, such as within MCU HW 203 of FIG. 2, or an external processor watchdog circuit can be used. The processor watchdog circuit can interact with a portion of MCU HW 203 that provides general processing functionality so that loss of such general processing functionality through some malfunction can be detected by the processor watchdog circuit and used to change the state of processor status interconnect conductor 307, activating failsafe circuit 301.

Thus, a processor can be configured to provide a first level indicating an operational status of the processor to the processor status interconnect conductor when the processor is operational and to provide a second level indicating a non-operational status of the processor to the processor status interconnect conductor when the processor is non-operational. As an example, in an extreme case of the power supply to the processor falling to zero volts (e.g., ground potential), the output voltage can also fall to zero volts. If either the first power control interconnect conductor 308 or the second power control interconnect conductor 309 is at a logic level having positive voltage with respect to interconnect 310, the respective one or ones of diode 304 and diode 305 are forward-biased and conduct, applying the positive voltage (minus a diode's forward-voltage drop) to interconnect 310.

That voltage, in conjunction with the lower (e.g., zero-volt) voltage of processor status interconnect conductor 307 can turn on transistor 302 (e.g., a P-channel MOSFET), causing transistor 302 to pull down interconnect 310 nearly to the voltage of interconnect 311, which is ground potential 306. Diodes 304 and 305 can be forward biased by a lower voltage at interconnect 310 and a higher voltage at a respective one of first power control interconnect conductor 308 and second power control interconnect conductor 309. The forward biasing of either or both of diodes 304 and 305 allows either or both of them to conduct and to pull down either or both of first power control interconnect conductor 308 and second power control interconnect conductor 309 to a logic level at or near ground potential 306.

If a failsafe transmit power level is specified to be represented by a low logic level at both of first power control interconnect conductor 308 and second power control interconnect conductor 309, the operation of failsafe circuit 301 can force both first power control interconnect conductor 308 and second power control interconnect conductor 309 to such a low logic level, forcing a radio connected to first power control interconnect conductor 308 and second power control interconnect conductor 309 to set a failsafe transmit power level. The forcing of first power control interconnect conductor 308 and second power control interconnect conductor 309 to a low logic level can occur even if a circuit normally driving first power control interconnect conductor 308 and second power control interconnect conductor 309, such as an antenna controller or its MCU, is outputting a different logic level to either or both of first power control interconnect conductor 308 and second power control interconnect conductor 309.

That can be achieved by controlling the respective impedances of the drive circuits. For example, failsafe circuit 301 can be configured to drive either or both of first power control interconnect conductor 308 and second power control interconnect conductor 309 to a low logic level with a lower impedance than an antenna controller or its MCU would attempt to drive either or both of first power control interconnect conductor 308 and second power control interconnect conductor 309 to a higher logic level with a higher impedance. The higher impedance of the normal driving circuit, such as the antenna controller or its MCU, can be achieved, for example, through the use of a pull-up resistor within the antenna controller or its MCU, or, as another example, a resistor may be placed in series with each of first power control interconnect conductor 308 and second power control interconnect conductor 309 to raise their impedances.

Figure 4:
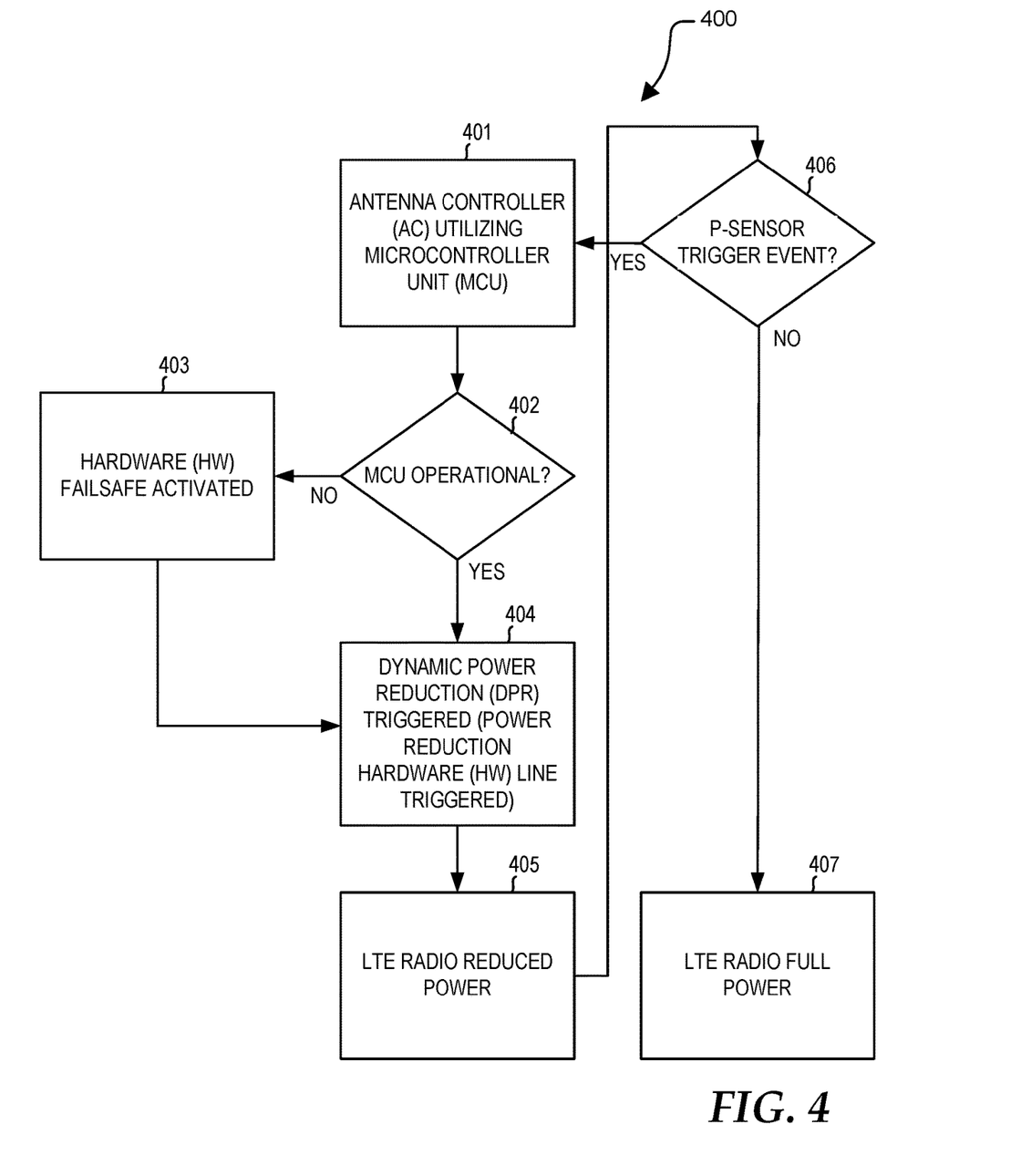
FIG. 4 is a flow diagram illustrating a method for providing failsafe radio transmit power control according to at least one embodiment of the present disclosure.

FIG. 4 shows a method for providing failsafe radio transmit power control according to at least one embodiment of the present disclosure. Method 400 begins at block 401, where operation of an antenna controller (AC), as may utilize a microcontroller unit (MCU), occurs. From block 401, method 400 continues to decision block 402. At decision block 402, a decision is made as to whether or not the AC (for example the MCU of the AC) is operational. If the AC is not operational, method 400 continues to block 403. At block 403, a hardware (HW) failsafe circuit is activated. From block 403, method 400 continues to block 404. If, at decision block 402, a decision was made that the AC is operational, method 400 continues to block 404. At block 404, dynamic power reduction (DPR) is triggered. For example, a power reduction hardware (HW) line can be triggered.

As an example, processor status interconnect conductor 307 can be triggered. For example, it can be provided at a low logic level to failsafe circuit 301, causing transistor 302 to turn on, forcing first power control interconnect conductor 308 and second power control interconnect conductor 309 to a low logic level. From block 404, method 400 continues to block 405. At block 405, a radio transmit power level is reduced to a failsafe radio transmit power level. The failsafe radio transmit level can assure regulatory compliance in absence of active control by the AC, such as active control in response to a proximity signal received from a P-sensor. For example, a LTE radio power level can be reduced. From block 405, method 400 continues to decision block 406. At decision block 406, a decision is made as to whether or not a P-sensor trigger event has occurred.

If a P-sensor trigger event has occurred, method 400 returns to block 401. If a P-sensor trigger event has not occurred, method 400 continues to block 407. At block 407, the radio is set to full power. As an example, if the radio is a LTE radio, the LTE radio is set to full power. Full power can be a power level that need not be reduced to comply with specific absorption rate (SAR) regulations in absence of proximity of a person to one or more antennas of the radio.

In accordance with at least one embodiment, an intelligent HW failsafe mechanism for a M.2 radio using an antenna controller (AC). A M.2 radio is a digital radio for computer communication having a form-factor compatible with an interface of computer suitable for installation of such a radio. Accordingly, the radio can be an optional hardware component that can be installed at a factory when the computer is manufactured or installed after the initial sale of the computer.

Without a mechanism to detect whether proximity sensor HW or antenna controller HW has malfunctioned or the controller IC (MCU) has failed from a HW perspective, control of a radio transmit power level of a radio system could potentially be lost, raising the possibility that the radio might transmit at an excessive transmit power level. Such an excessive transmit power level could arise if failed proximity sensing were unable to detect a person in proximity to an antenna or if a failed processor processing proximity sensing information were unable to issue an appropriate power reduction output to the radio.

Software (SW) or firmware (FW) protection such as software-based or firmware-based heartbeats rely on operational hardware (HW) and are not necessarily able to identify HW failures. When a SW or FW approach is used in human proximity detection for specific absorption rate (SAR) applications, there is a risk that the intermediate controller has malfunctioned or failed and the P-sensor is rendered useless, but a system without a hardware failsafe circuit would have no way of detecting such a malfunction. Even if a HW malfunction can be detected, a simple but extreme solution of shutting down a radio, such as a WWAN radio or system, in case of a HW failure would be undesirable, as it would result in a significant loss of functionality in an IHS.

A solution such as that described herein enables functionality without having to shut down the radio. As a user engages with the device, especially physically interacting near where the antennas are located, protection of a user from exposure to excessive RF radiation and hence a high specific absorption rate (SAR), which could otherwise exceed regulatory limits, is needed. Accordingly, a system and method to provide control of a radio transmit power level in the event of hardware failure is provided.

Instead of having to take an extreme action such as shutting down the device totally or shutting down the radio access technology (RAT), which would lead to poor user experience, a hardware (HW) failsafe circuit is provided to monitor the controller for malfunction, such as hardware failure. In the event of an integrated circuit (IC) failure of the controller, the failsafe HW circuitry would activate, triggering the power reduction lines, placing the device in a safe transmit power (low transmit power) mode, maintaining compliance with regulatory standards and allowing continued operation of the system, avoiding inconvenience to a user of the system. The described solution can be implemented for other HW devices and applications. In this instance, it can monitor the controller IC to ensure the power reduction circuitry is utilized in the correct state.

In accordance with at least one embodiment, a system, circuit, and method to monitor the health of the controller IC and, in the event of failure, to assert positive control over digital signal lines to assure the radio is configured to operate at a failsafe transmit power level are provided. For example, in a system using a microcontroller unit (MCU) that could possibly fail, compliance with regulatory standards can be maintained in the event of HW failures even if such HW failures can't be monitored by heartbeat (HB) firmware (FW), such as HB FW of the MCU, and continued use of an IHS with at least some limited functionality can be provided.

In accordance with at least one embodiment, a system and method are provided to trigger HW failsafe notification to a radio, using a HW failsafe circuit and a method, which can be implemented in a processor, such as the MCU of an AC. According to such a method, the antenna controller can periodically monitor the health of the controller (e.g., for IC failure) and of antenna P-sensors connected to it. Upon a failure condition of either the controller or attached sensors, the method activates the attached failsafe HW circuit to notify the radio, forcing the states of the input-output (IO) lines connected to the radio, enabling a failsafe power cutback to comply with regulatory provisions. Accordingly, the controller IC and P-sensors can be monitored to ensure the power reduction circuitry attached to the radio is utilized in the correct state.

In accordance with at least one embodiment, a method comprises applying a first power control interconnect conductor to a first terminal of a failsafe circuit; applying a second power control interconnect conductor to a second terminal of the failsafe circuit; applying a processor status interconnect conductor to a third terminal of a failsafe circuit; and configuring a processor to provide a first level indicating an operational status of the processor to the processor status interconnect conductor when the processor is operational and to provide a second level indicating a non-operational status of the processor to the processor status interconnect conductor when the processor is non-operational, the failsafe circuit configured to assure, upon provision of the second level to the processor status interconnect conductor, the first power control interconnect conductor will be in a first failsafe state and the second power control interconnect conductor will be in a second failsafe state. In accordance with at least one embodiment, both the first failsafe state and the second failsafe state are a grounded state. In accordance with at least one embodiment, the applying the processor status interconnect conductor to the third terminal of the failsafe circuit comprises applying the processor status interconnect conductor to a gate terminal of a positive-channel (P-channel) metal-oxide-semiconductor field-effect transistor (MOSFET). In accordance with at least one embodiment, the applying the first power control interconnect conductor to the first terminal of the failsafe circuit comprises applying the first power control interconnect conductor through a first diode to a source terminal of the P-channel MOSFET. In accordance with at least one embodiment, the applying the second power control interconnect conductor to the second terminal of the failsafe circuit comprises applying the second power control interconnect conductor through a second diode to the source terminal of the P-channel MOSFET. In accordance with at least one embodiment, the first power control interconnect conductor is connected to the processor and to a radio circuit, and wherein the second power control interconnect conductor is connected to the processor and to the radio circuit. In accordance with at least one embodiment, when the processor provides the first level indicating the operational status of the processor to the processor status interconnect conductor, the processor is configured to individually control the first power control interconnect conductor and the second power control interconnect conductor to select a transmit power level to be used by a radio circuit to which the first power control interconnect conductor and the second power control interconnect conductor are connected.

In accordance with at least one embodiment, an information handling system (IHS) comprising a processor; a radio circuit; and a failsafe circuit connected to a first power control interconnect conductor, to a second power control interconnect conductor, and to a processor status interconnect conductor, the processor configured to provide a first level indicating an operational status of the processor to the processor status interconnect conductor when the processor is operational and to provide a second level indicating a non-operational status of the processor to the processor status interconnect conductor when the processor is non-operational, the failsafe circuit configured to assure, upon provision of the second level to the processor status interconnect conductor, the first power control interconnect conductor will be in a first failsafe state and the second power control interconnect conductor will be in a second failsafe state. In accordance with at least one embodiment, both the first failsafe state and the second failsafe state are a grounded state. In accordance with at least one embodiment, the failsafe circuit comprises a positive-channel (P-channel) metal-oxide-semiconductor field-effect transistor (MOSFET), and the processor status interconnect conductor is connected to a gate terminal of the MOSFET. In accordance with at least one embodiment, the failsafe circuit further comprises a first diode, and the first power control interconnect conductor is connected through the first diode to a source terminal of the MOSFET. In accordance with at least one embodiment, the failsafe circuit further comprises a second diode, and the second power control interconnect conductor is connected through the second diode to the source terminal of the MOSFET. In accordance with at least one embodiment, the first power control interconnect conductor is connected to the processor and to the radio circuit, and wherein the second interconnect conductor is connected to the processor and to the radio circuit. In accordance with at least one embodiment, when the processor provides the first level indicating the operational status of the processor to the processor status interconnect conductor, the processor is configured to individually control the first power control interconnect conductor and the second power control interconnect conductor to select a transmit power level to be used by a radio circuit to which the first power control interconnect conductor and the second power control interconnect conductor are connected.

In accordance with at least one embodiment, a method comprises applying a first power control interconnect conductor to a first terminal of a failsafe circuit, the first power control interconnect conductor connected to a processor and to a radio circuit; applying a second power control interconnect conductor to a second terminal of the failsafe circuit, the second power control interconnect conductor connected to the processor and to the radio circuit; applying a processor status interconnect conductor to a third terminal of the failsafe circuit, the processor status interconnect conductor connected to the processor; and configuring the processor to provide a first logic level indicating an operational status of the processor to the processor status interconnect conductor when the processor is operational and to provide a second logic level indicating a non-operational status of the processor to the processor status interconnect conductor when the processor is non-operational, the failsafe circuit configured to assure, upon provision of the second logic level to the processor status interconnect conductor, the first power control interconnect conductor will be in a first failsafe state and the second power control interconnect conductor will be in a second failsafe state. In accordance with at least one embodiment, both the first failsafe state and the second failsafe state are a grounded state. In accordance with at least one embodiment, the applying the processor status interconnect conductor to the third terminal of the failsafe circuit comprises applying the processor status interconnect conductor to a gate terminal of a positive-channel (P-channel) metal-oxide-semiconductor field-effect transistor (MOSFET). In accordance with at least one embodiment, the applying the first power control interconnect conductor to the first terminal of the failsafe circuit comprises applying the first power control interconnect conductor through a first diode to a source terminal of the P-channel MOSFET. In accordance with at least one embodiment, the applying the second power control interconnect conductor to the second terminal of the failsafe circuit comprises applying the second power control interconnect conductor through a second diode to the source terminal of the P-channel MOSFET. In accordance with at least one embodiment, when the processor provides the first level indicating the operational status of the processor to the processor status interconnect conductor, the processor is configured to individually control the first power control interconnect conductor and the second power control interconnect conductor to select a transmit power level to be used by a radio circuit to which the first power control interconnect conductor and the second power control interconnect conductor are connected.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. Information handling systems can also include one or more buses operable to transmit information between the various hardware components.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   applying a first power control interconnect conductor to a first terminal of a failsafe circuit;
   applying a second power control interconnect conductor to a second terminal of the failsafe circuit;
   applying a processor status interconnect conductor to a third terminal of a failsafe circuit;
   configuring a processor to provide a first level indicating an operational status of the processor to the processor status interconnect conductor when the processor is operational and to provide a second level indicating a non-operational status of the processor to the processor status interconnect conductor when the processor is non-operational, the failsafe circuit configured to assure, upon provision of the second level to the processor status interconnect conductor, the first power control interconnect conductor will be in a first failsafe state and the second power control interconnect conductor will be in a second failsafe state; and
   based on the first and second failsafe states, transmitting, by a radio circuit, at a failsafe transmit power level.

2. The method of claim 1, wherein both the first failsafe state and the second failsafe state are a grounded state.

3. The method of claim 1, wherein the applying the processor status interconnect conductor to the third terminal of the failsafe circuit comprises:
   applying the processor status interconnect conductor to a gate terminal of a positive-channel (P-channel) metal-oxide-semiconductor field-effect transistor (MOSFET).

4. The method of claim 3, wherein the applying the first power control interconnect conductor to the first terminal of the failsafe circuit comprises:
   applying the first power control interconnect conductor through a first diode to a source terminal of the P-channel MOSFET.

5. The method of claim 4, wherein the applying the second power control interconnect conductor to the second terminal of the failsafe circuit comprises:
   applying the second power control interconnect conductor through a second diode to the source terminal of the P-channel MOSFET.

6. The method of claim 1, wherein the first power control interconnect conductor is connected to the processor and to the radio circuit, and wherein the second power control interconnect conductor is connected to the processor and to the radio circuit.

7. The method of claim 1, wherein, when the processor provides the first level indicating the operational status of the processor to the processor status interconnect conductor, the processor is configured to individually control the first power control interconnect conductor and the second power control interconnect conductor to select a transmit power level to be used by the radio circuit, the radio circuit connected to the first power control interconnect conductor and the second power control interconnect conductor.

8. An information handling system (IHS) comprising:
   a processor;
   a radio circuit; and
   a failsafe circuit connected to a first power control interconnect conductor, to a second power control interconnect conductor, and to a processor status interconnect conductor, the processor configured to provide a first level indicating an operational status of the processor to the processor status interconnect conductor when the processor is operational and to provide a second level indicating a non-operational status of the processor to the processor status interconnect conductor when the processor is non-operational, the failsafe circuit configured to assure, upon provision of the second level to the processor status interconnect conductor, the first power control interconnect conductor will be in a first failsafe state and the second power control interconnect conductor will be in a second failsafe state, wherein based on the first and second failsafe states, the radio circuit to transmit at a failsafe transmit power level.

9. The IHS of claim 8, wherein both the first failsafe state and the second failsafe state are a grounded state.

10. The IHS of claim 8, wherein the failsafe circuit comprises a positive-channel (P-channel) metal-oxide-semiconductor field-effect transistor (MOSFET), and the processor status interconnect conductor is connected to a gate terminal of the MOSFET.

11. The IHS of claim 10, wherein the failsafe circuit further comprises a first diode, and the first power control interconnect conductor is connected through the first diode to a source terminal of the MOSFET.

12. The IHS of claim 11, wherein the failsafe circuit further comprises a second diode, and the second power control interconnect conductor is connected through the second diode to the source terminal of the MOSFET.

13. The IHS of claim 8, wherein the first power control interconnect conductor is connected to the processor and to the radio circuit, and wherein the second interconnect conductor is connected to the processor and to the radio circuit.

14. The IHS of claim 8, wherein, when the processor provides the first level indicating the operational status of the processor to the processor status interconnect conductor, the processor is configured to individually control the first power control interconnect conductor and the second power control interconnect conductor to select a transmit power level to be used by the radio circuit, the radio circuit connected to the first power control interconnect conductor and the second power control interconnect conductor.

15. A method comprising:
applying a first power control interconnect conductor to a first terminal of a failsafe circuit, the first power control interconnect conductor connected to a processor and to a radio circuit;
applying a second power control interconnect conductor to a second terminal of the failsafe circuit, the second power control interconnect conductor connected to the processor and to the radio circuit;
applying a processor status interconnect conductor to a third terminal of the failsafe circuit, the processor status interconnect conductor connected to the processor;
configuring the processor to provide a first logic level indicating an operational status of the processor to the processor status interconnect conductor when the processor is operational and to provide a second logic level indicating a non-operational status of the processor to the processor status interconnect conductor when the processor is non-operational, the failsafe circuit configured to assure, upon provision of the second logic level to the processor status interconnect conductor, the first power control interconnect conductor will be in a first failsafe state and the second power control interconnect conductor will be in a second failsafe state; and
based on the first and second failsafe states, transmitting, by a radio circuit, at a failsafe transmit power level.

16. The method of claim 15, wherein both the first failsafe state and the second failsafe state are a grounded state.

17. The method of claim 15, wherein the applying the processor status interconnect conductor to the third terminal of the failsafe circuit comprises:
applying the processor status interconnect conductor to a gate terminal of a positive-channel (P-channel) metal-oxide-semiconductor field-effect transistor (MOSFET).

18. The method of claim 17, wherein the applying the first power control interconnect conductor to the first terminal of the failsafe circuit comprises:
applying the first power control interconnect conductor through a first diode to a source terminal of the P-channel MOSFET.

19. The method of claim 18, wherein the applying the second power control interconnect conductor to the second terminal of the failsafe circuit comprises:
applying the second power control interconnect conductor through a second diode to the source terminal of the P-channel MOSFET.

20. The method of claim 15, wherein, when the processor provides the first level indicating the operational status of the processor to the processor status interconnect conductor, the processor is configured to individually control the first power control interconnect conductor and the second power control interconnect conductor to select a transmit power level to be used by the radio circuit, the radio circuit connected to the first power control interconnect conductor and the second power control interconnect conductor.

* * * * *